(12) United States Patent
Chiang et al.

(10) Patent No.: US 10,600,318 B1
(45) Date of Patent: Mar. 24, 2020

(54) BLIND GUIDING EQUIPMENT IN PEDESTRIAN CROSSWALK

(71) Applicants: Min-Yueh Chiang, New Taipei (TW);
Jonathan-Paul Hsu, Taipei (TW);
Frances-Adrienne Hsu, Taipei (TW)

(72) Inventors: Min-Yueh Chiang, New Taipei (TW);
Jonathan-Paul Hsu, Taipei (TW);
Frances-Adrienne Hsu, Taipei (TW)

( * ) Notice: Subject to any disclaimer, the term of this patent is extended or adjusted under 35 U.S.C. 154(b) by 0 days.

(21) Appl. No.: 16/362,628

(22) Filed: Mar. 23, 2019

(51) Int. Cl.
*G08G 1/005* (2006.01)
*A61H 3/06* (2006.01)
*G08G 1/095* (2006.01)
*G09B 21/00* (2006.01)

(52) U.S. Cl.
CPC ........... *G08G 1/005* (2013.01); *G09B 21/003* (2013.01); *G09B 21/006* (2013.01)

(58) Field of Classification Search
None
See application file for complete search history.

(56) References Cited

U.S. PATENT DOCUMENTS

| | | | | |
|---|---|---|---|---|
| 4,025,922 A * | 5/1977 | Trawick, III | ......... | A61H 3/061 342/24 |
| 6,127,943 A * | 10/2000 | Tauchi | ................. | A61H 3/061 340/4.14 |
| 8,786,466 B1 * | 7/2014 | Aladas | ................... | G08G 1/005 340/906 |
| 2006/0217874 A1 * | 9/2006 | Ueda | ....................... | G08G 1/07 701/117 |
| 2015/0066353 A1 * | 3/2015 | Klein | ................... | G01C 21/206 701/408 |
| 2015/0379860 A1 * | 12/2015 | Vardi | ..................... | G08B 25/10 340/8.1 |

* cited by examiner

*Primary Examiner* — John F Mortell
(74) *Attorney, Agent, or Firm* — Maschoff Brennan

(57) ABSTRACT

Disclosed is a blind guiding equipment comprising a directional speaker, a calling transmitter disposed in a crosswalk beginning area of a pedestrian crosswalk, an access status sensor configured to sense a current status of a traffic signal which belongs to the pedestrian crosswalk, and a controller in signal connection with the calling transmitter, the traffic signal state sensor and the directional speaker, wherein the controller is configured to activate the directional speaker, when calling data which is generated by the calling transmitter according to a trigger operation has been received and access status data has indicated that a pedestrian is allowed to cross the pedestrian crosswalk, to guide a visually impaired person to follow a directional guiding sound wave which propagates along the pedestrian crosswalk to cross along the pedestrian crosswalk.

11 Claims, 3 Drawing Sheets

BLIND GUIDING EQUIPMENT IN PEDESTRIAN CROSSWALK

FIELD OF THE INVENTION

The present invention relates to a blind guiding equipment in a pedestrian crosswalk, and more particularly relates to an audible blind guiding equipment in the pedestrian crosswalk.

BACKGROUND OF THE INVENTION

A pedestrian crosswalk, which is a traffic marking painted on a road surface, is a place designated for pedestrians to cross a road. A pedestrian crosswalk is often found at intersections or the middle sections of roads where many pedestrians cross. Today, as most of the pedestrian crosswalks, a zebra crossing having alternating dark and light stripes is used for reminding car drivers to give way to the pedestrians crossing the road. However, the use of such traffic markings is not enough for controlling and directing traffic in a place where the traffic volume of pedestrians and vehicles is high, and there are often accidents caused by pedestrians and vehicles struggling for smooth traffic on the same road. Therefore, traffic signals, also known as traffic lights, are also provided at the pedestrian crosswalk to control flows of traffic. However, such traffic signals only provide light signs for pedestrians to follow when crossing the road, but are unkindly for a visually impaired person.

In recent years, due to the society's concern for the safety of vulnerable groups, access-free facilities have also become a part of urban construction. Therefore, in order to provide an accessible environment for visually impaired persons in pedestrian crosswalks, audible traffic signals are also provided. The audible traffic signals, when changed to green, indicate a walking direction of pedestrians by producing different sounds to help visually impaired persons recognize the light signs for easily crossing the pedestrian crosswalk. However, although such audible traffic signals can produce different sounds to indicate different directions to guide visually impaired persons, the sounds are emitted in all directions and are easy to cause confusion, which makes the visually impaired persons unable to recognize the walking direction, and deviate from the walking direction when crossing, resulting in danger or accident. Furthermore, the visually impaired persons have to be trained to be able to recognize the directions represented by different sounds of the audible traffic signal, and it is very inconvenient for them. Moreover, in order for the visually impaired persons to clearly hear the sounds of the audible traffic signal, the sound volume must be greater than the ambient noise. However, such a sound volume is nothing but a noise that affects the lives of nearby residents and also causes them physical and mental harm after a long-term exposure.

SUMMARY OF THE INVENTION

In view of the above, in a prior art, a conventional audible traffic signal of the pedestrian crosswalk has disadvantages of being unable to accurately guide the walking direction and generating disturbance noise, which is necessary to be improved.

Therefore, an objective of the present invention is to provide a blind guiding equipment in pedestrian crosswalk for effectively guiding a visually impaired person and reducing the impact of noise on the surrounding environment.

In order to overcome the technical problems in prior art, the present invention provides a blind guiding equipment in a pedestrian crosswalk, comprising: a directional speaker disposed facing the pedestrian crosswalk, the directional speaker being configured to, when activated, emit a guiding sound wave which propagates along a predetermined directional propagating path, the predetermined directional propagating path being extended along the pedestrian crosswalk; a calling transmitter disposed in a crosswalk beginning area located at one end of the pedestrian crosswalk, the calling transmitter being configured to generate calling data when the calling transmitter is triggered by a trigger operation; an access status sensor configured to sense a current status of a traffic signal which belongs to the pedestrian crosswalk to obtain access status data, the access status data being related to whether a pedestrian is allowed to cross the pedestrian crosswalk or the pedestrian is not allowed to cross the pedestrian crosswalk; and a controller which is in signal connection with the calling transmitter, the traffic signal state sensor and the directional speaker, the controller being configured to activate the directional speaker, when the calling data has been received and the access status data has indicated that the pedestrian is allowed to cross the pedestrian crosswalk, to guide a visually impaired person to follow the directional guiding sound wave to cross along the pedestrian crosswalk.

In one embodiment of the present invention, it provides a blind guiding equipment further comprising a portable trigger, the portable trigger being carried by the pedestrian, the calling transmitter being provided with a trigger sensor, the trigger sensor being operated within a sensing coverage area which correspondingly covers the crosswalk beginning area, wherein the calling transmitter is triggered by the trigger operation from the portable trigger to transmit the calling data when the trigger sensor has sensed the trigger operation which is from the portable trigger is sensed within the sensing coverage area.

In one embodiment of the present invention, it provides a blind guiding equipment further comprising a guiding lane provided in the pedestrian crosswalk, the guiding lane being extended along the directional propagating path.

In one embodiment of the present invention, it provides a blind guiding equipment further comprising a guiding termination sensor disposed in a crosswalk ending area, the crosswalk ending area located at another end of the pedestrian crosswalk in such a manner that the crosswalk ending area is opposite to the crosswalk beginning area, the crosswalk ending area being in signal connection with the controller, wherein the controller is configured to terminate the guiding sound wave broadcasting operation of the directional speaker when the guiding termination sensor senses that the pedestrian is in the crosswalk ending area.

In one embodiment of the present invention, it provides a blind guiding equipment, wherein the portable trigger is provided with an electrical conductor, the triggering sensor is a touch sensing circuit laid in the crosswalk beginning area such that the portable trigger is able to be sensed by the triggering sensor when the electrical conductor is within the sensing coverage area.

In one embodiment of the present invention, it provides a blind guiding equipment, wherein the portable trigger is provided with a sound alert or a vibration alert configured to produce a notification sound or a notification vibration when the calling transmitter is triggered by the portable trigger.

In one embodiment of the present invention, it provides a blind guiding equipment, wherein the portable trigger is in the shape of a cane for the visually impaired person.

In one embodiment of the present invention, it provides a blind guiding equipment, wherein the portable trigger is in the shape of a shoe attachment which is attached in a shoe.

In one embodiment of the present invention, it provides a blind guiding equipment, wherein the controller is configured to change sound properties of the guiding sound wave broadcasting from the directional speaker according to the remaining time that the pedestrian is allowed to cross the pedestrian crosswalk.

In one embodiment of the present invention, it provides a blind guiding equipment, wherein the directional speaker is a 40 KHz ultrasonic directional speaker array.

With the technical means adopted by the present invention, the blind guiding equipment can use the controller to activate the directional speaker, when the access status data has indicated that the pedestrian is allowed to cross the pedestrian crosswalk, to guide a visually impaired person to follow the directional guiding sound wave to cross along the pedestrian crosswalk. In this way, the visually impaired person can easily recognize the direction of crossing, quickly pass through the road, and know that the walking direction is wrong according to weakening of the guiding sound wave so as to correct the walking direction to be within the range of the sound beam, and thereby the sense of security of the visually impaired persons can be improved and the safety of pedestrians and vehicles can be ensured. Furthermore, the guiding sound wave of the directional speaker is directional and is emitted along a predetermined path so as not to disturb others, nor to be perceived as noise. Moreover, the blind guiding equipment of the present invention is simple in structure and relatively low in cost, and does not cause too much economic burden on installation.

Furthermore, the present invention further provides the trigger sensor and the guiding termination sensor, and thereby the trigger sensor is triggered to activate the directional speaker to emit the guiding sound wave when the access status data has indicated that the pedestrian is allowed to cross the pedestrian crosswalk and the guiding termination sensor is triggered to terminate the guiding sound wave broadcasting operation of the directional speaker, thereby achieving the purpose of power saving, noise reduction and effective operation.

DETAILED DESCRIPTION OF THE PREFERRED EMBODIMENTS

The preferred embodiments of the present invention are described in detail below with reference to FIG. 1 to FIG. 3. The description is used for explaining the embodiments of the present invention only, but not for limiting the scope of the claims.

Figure 1:
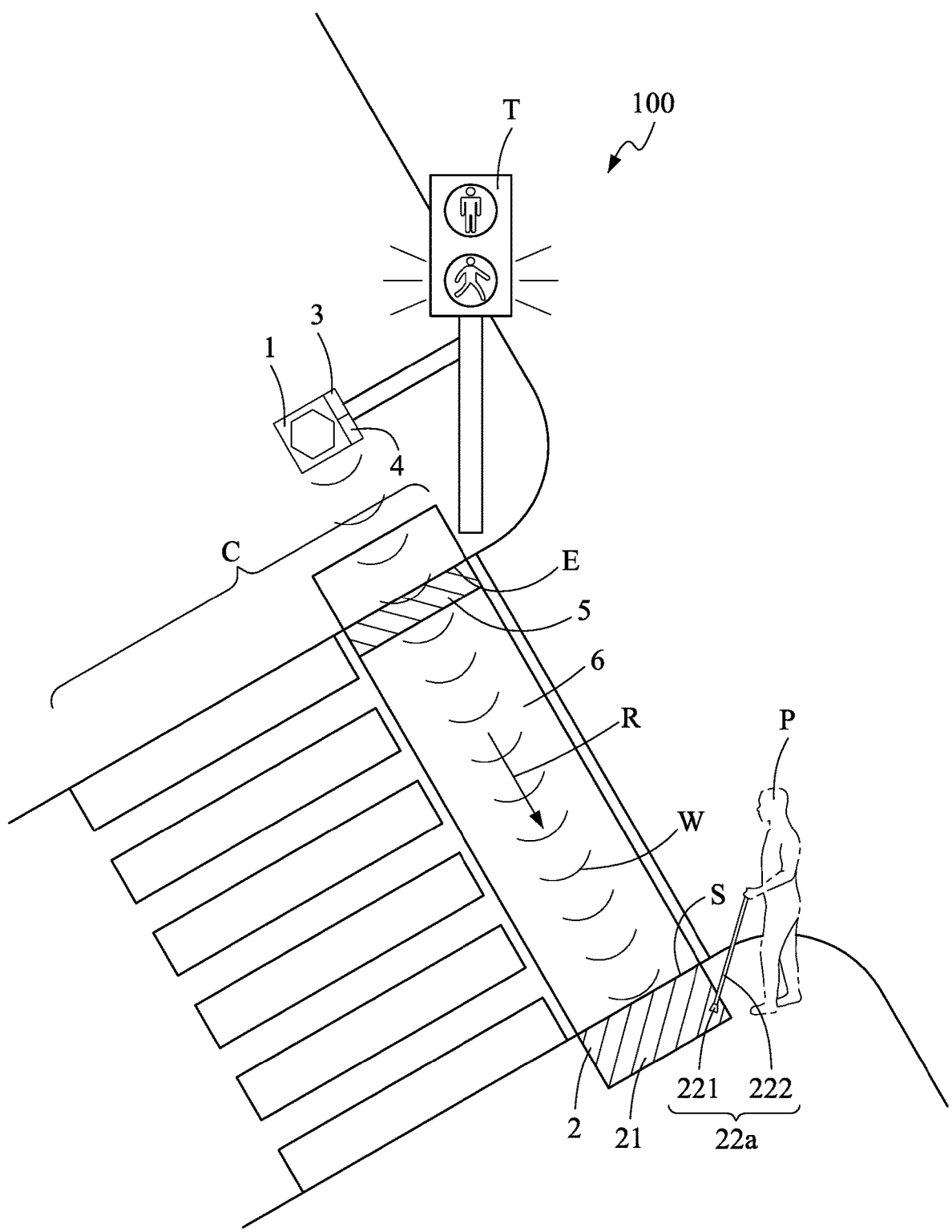
FIG. 1 is a schematic drawing illustrating a blind guiding equipment in a pedestrian crosswalk according to an embodiment of the present invention.

As shown in FIG. 1, according to an embodiment of the present invention, a blind guiding equipment 100 is provided at a pedestrian crosswalk C and is used for guiding a visually impaired person P. The blind guiding equipment 100 includes: a directional speaker 1, a calling transmitter 2, an access status sensor 3 and a controller 4. For convenience of explanation, in this embodiment, one blind guiding equipment 100 for one passing direction is provided at the pedestrian crosswalk C (as shown in FIG. 1). However, the blind guiding equipment can be provided in plural for different passing directions. As shown in FIG. 3, in another embodiment of the present invention, two blind guiding equipments are provided, i.e., one blind guiding equipment 100b and one blind guiding equipment provided opposite to the blind guiding equipment 100b.

As shown in FIG. 1, the directional speaker 1 is disposed facing the pedestrian crosswalk C. The directional speaker 1 is configured to, when activated, emit a guiding sound wave W. The guiding sound wave W propagates with a specific beam-like range along a predetermined directional propagating path R in the pedestrian crosswalk C.

Specifically, as shown in FIG. 1, the directional speaker 1 is mounted on a traffic signal T at a crosswalk ending area E of the pedestrian crosswalk C. The traffic signal T belongs to the pedestrian crosswalk C and is provided opposite to a crosswalk beginning area S of the pedestrian crosswalk C. The directional speaker 1 faces the crosswalk beginning area S such that the guiding sound wave W directionally propagates along the pedestrian crosswalk C from the crosswalk ending area E to the crosswalk beginning area S.

In this embodiment, the directional speaker 1 is an ultrasonic directional speaker of which the emitted guiding sound wave W is directional. The ultrasonic directional speaker produces the sound wave by combining a non-directional modulating wave with a directional carrier wave such that the sound wave becomes a narrow and focused sound beam which can propagate to a specific target in a specific direction instead of spreading over a fairly wide area. Therefore, it can avoid disturbing other people in the same place. Furthermore, the guiding sound wave W is a sound beam having a specific narrow range within which a loud sound can be heard and out of which the sound becomes murmurous or cannot be heard, and thereby the visually impaired person P can be effectively guided and will not deviate. Preferably, the directional speaker 1 is a 40 KHz ultrasonic directional speaker array of having the effective range up to 100 meters (when a large array and high power is provided).

Figure 3:
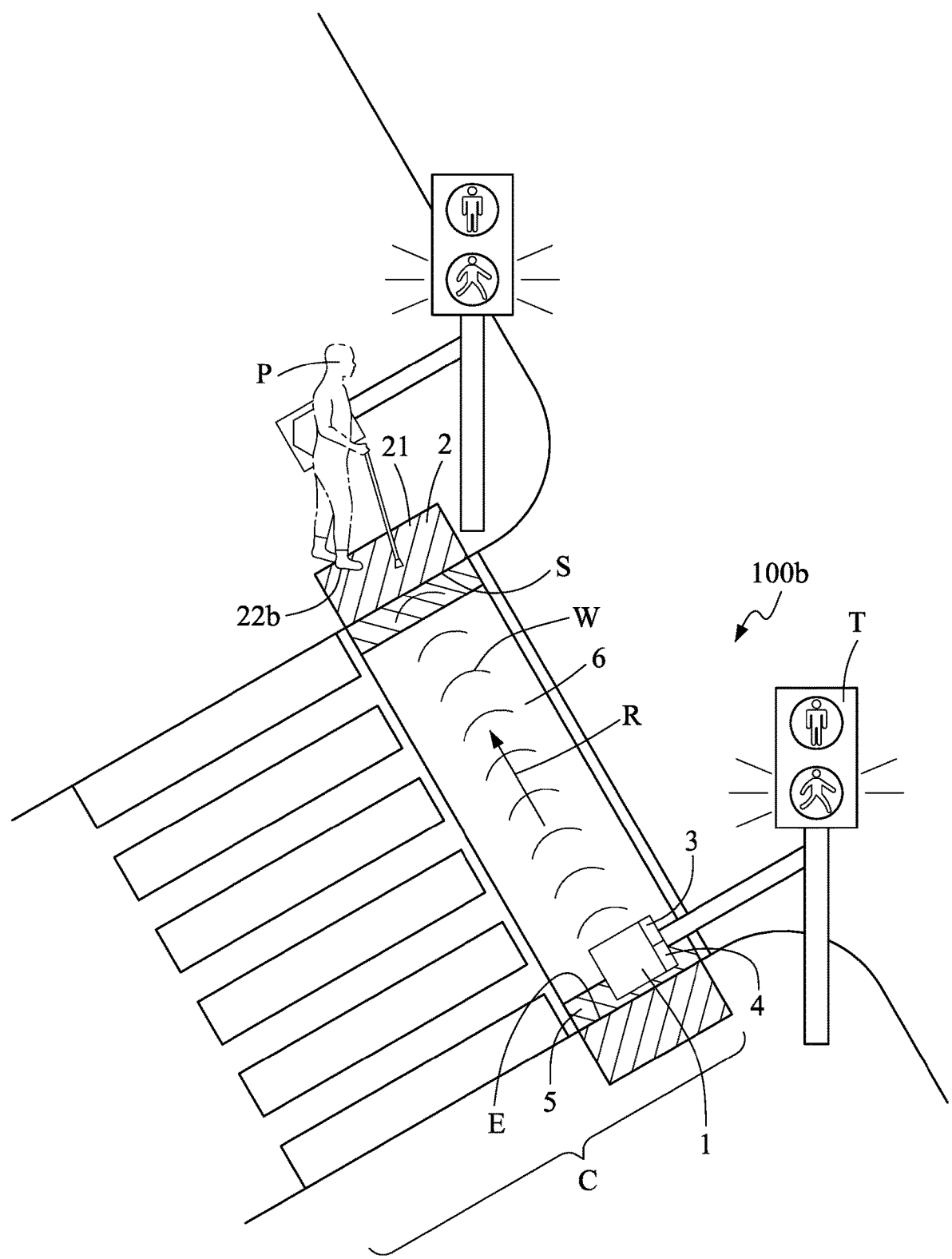
FIG. 3 is another schematic drawing illustrating a blind guiding equipment in a pedestrian crosswalk according to an embodiment of the present invention.

Furthermore, as shown in FIG. 1 and FIG. 3, in the blind guiding equipment 100, a guiding lane 6 can be provided in the pedestrian crosswalk C for the visually impaired person P to pass along. The guiding lane 6 is in a crosswalk type and is demarcated at a part of the pedestrian crosswalk C. The guiding lane 6 is extended along the directional propagating path R and is disposed within an available area of the guiding sound wave W. In this embodiment, the guiding lane 6 is arranged in parallel with a zebra crossing at the pedestrian crosswalk C. The guiding lane 6 is arranged at the outermost side of the pedestrian crosswalk C and is distinguished from the zebra crossing by pattern or color to remind the pedestrians to pay attention to and make way for the visually impaired person P walking in the guiding lane 6 so as to guarantee safety of the visually impaired person P. However, the present invention is not limited to this, and the guiding lane 6 may be arranged in the middle line of the pedestrian crosswalk C.

As shown in FIG. 1 and FIG. 3, the calling transmitter 2 is disposed in a crosswalk beginning area S located at one end of the pedestrian crosswalk C. The calling transmitter 2 is configured to generate calling data when the calling transmitter 2 is triggered by a trigger operation. In this embodiment, the calling transmitter 2 is configured to generate the calling data when the calling transmitter 2 is triggered by a trigger operation of a portable trigger (22a, 22b). The portable trigger (22a, 22b) is carried by the pedestrian. The calling transmitter 2 is provided with a trigger sensor 21. The trigger sensor 21 is operated within a sensing coverage area which correspondingly covers the crosswalk beginning area S, wherein the calling transmitter 2 is triggered by the trigger operation from the portable trigger (22a, 22b) to transmit the calling data when the trigger sensor 21 has sensed the trigger operation which is from the portable trigger (22a, 22b) is sensed within the sensing coverage area. However, the present invention is not limited to this, and the calling transmitter 2 may be configured to generate the calling data when the calling transmitter 2 is triggered by a trigger operation of a button or other switching devices without the use of the portable trigger (22a, 22b).

Specifically, as shown in FIG. 1 and FIG. 3, the portable trigger (22a, 22b) is provided with an electrical conductor 221. The triggering sensor 21 is a touch sensing circuit laid in the crosswalk beginning area S such that the portable trigger (22a, 22b) is able to be sensed by the triggering sensor 21 when the electrical conductor 221 is within the sensing coverage area. In this embodiment, the touch sensing circuit is formed of a conductive paint coating on the crosswalk beginning area S, and generates the calling data according to a conductive state formed by means of a contact between the touch sensing circuit and an electrical conductor. As shown in FIG. 1, the portable trigger 22a is in the shape of a cane for the visually impaired person. The electrical conductor 221 made of a conductive material is provided at the bottom of the portable trigger 22a. Alternatively, the portable trigger may be in the shape of a shoe attachment 22b which is attached in the bottom or other portion of a shoe, as shown in FIG. 3. Besides, the portable trigger may be a remote controller which can send a signal within a sensing coverage area to trigger the calling transmitter 2.

Alternatively, the portable trigger 22a is provided with a sound alert or a vibration alert 222 configured to produce a notification sound or a notification vibration when the calling transmitter 2 is triggered by the portable trigger 22a. As shown in FIG. 1, in this present embodiment, the sound alert or the vibration alert 222 is mounted on the cane for the visually impaired person and is configured to, when a closed circuit is formed by a contact between the triggering sensor 21 and the electrical conductor 221, produce a notification sound or a notification vibration to notify the visually impaired person P.

As shown in FIG. 1, the access status sensor 3 is configured to sense a current status of a traffic signal T which belongs to the pedestrian crosswalk C to obtain access status data, the access status data being related to whether a pedestrian is allowed to cross the pedestrian crosswalk (e.g., a green light) or the pedestrian is not allowed to cross the pedestrian crosswalk (e.g., a red light). In this embodiment, the access status sensor 3 is mounted on and connected to an exclusive pedestrian traffic signal T in the crosswalk ending area E. However, the present invention is not limited to this, the access status sensor 3 may be mounted on and connected to an exclusive vehicle traffic signal, and obtains access status data related to whether a pedestrian is allowed to cross the pedestrian crosswalk or the pedestrian is not allowed to cross the pedestrian crosswalk from the exclusive vehicle traffic signal.

Figure 2:
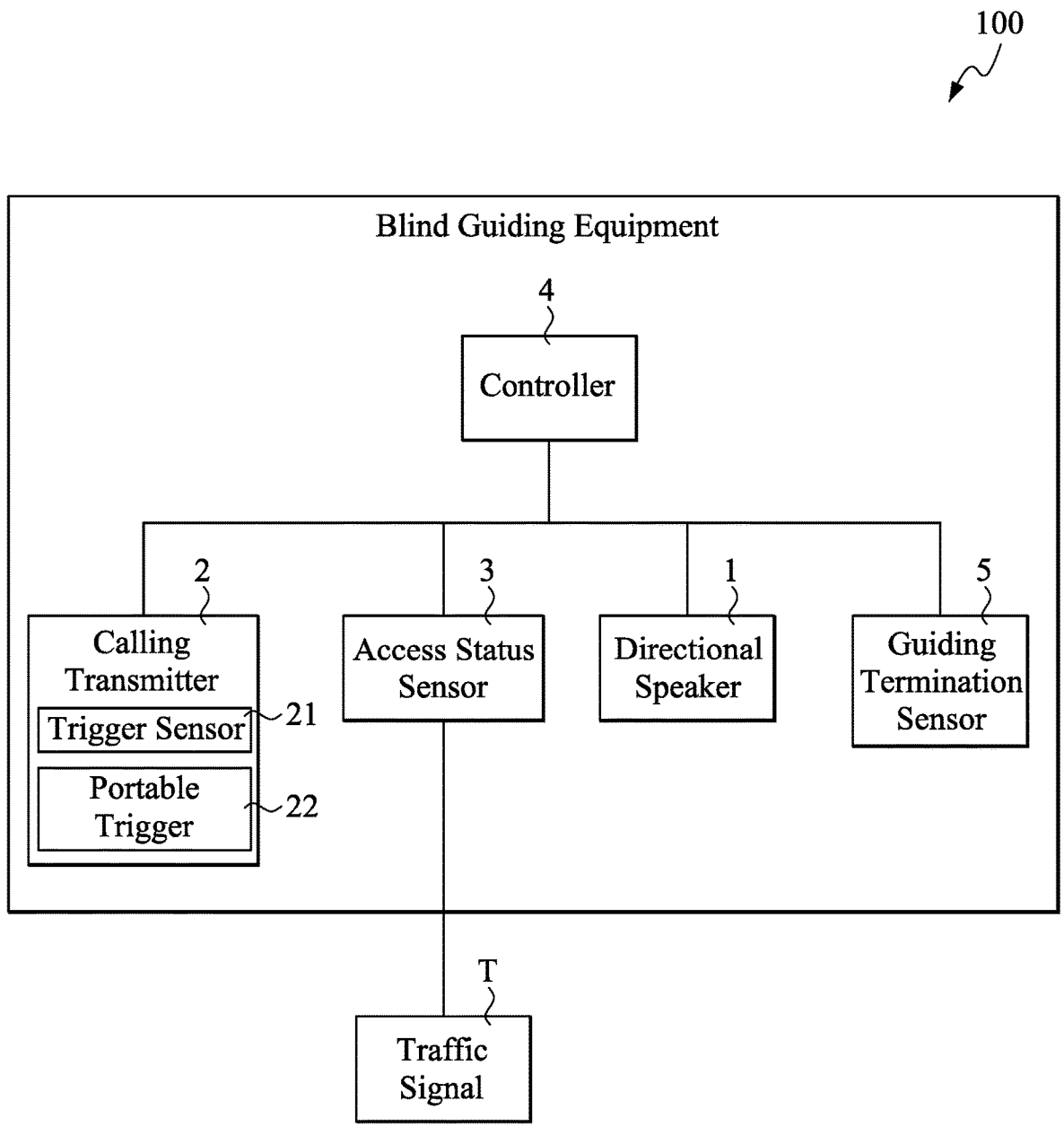
FIG. 2 is a schematic block diagram of the blind guiding equipment according to the embodiment of the present invention.

As shown in FIG. 1 and FIG. 2, the controller 4 is in signal connection with the calling transmitter 2, the access status sensor 3 and the directional speaker 1 in a remote or wired manner. The controller 4 is configured to activate the directional speaker 1, when the calling data has been received and the access status data has indicated that the pedestrian is allowed to cross the pedestrian crosswalk C (e.g., the green light), to guide the visually impaired person P to follow the directional guiding sound wave to cross along the pedestrian crosswalk C. In this embodiment, the controller 4 is mounted on the traffic signal T in the crosswalk ending area E to activate the directional speaker 1 at the current time of the pedestrian being allowed to cross the pedestrian crosswalk or the time of the pedestrian being allowed to cross the pedestrian crosswalk right after the receiving of the calling data.

Preferably, the controller 4 is configured to change sound properties of the guiding sound wave W broadcasting from the directional speaker 1 according to the remaining time that the pedestrian is allowed to cross the pedestrian crosswalk. In this embodiment, the controller 4 is configured to change sound properties of the guiding sound wave W in a frequency increasing manner according to the remaining time that the pedestrian is allowed to cross the pedestrian crosswalk so that the visually impaired person P walking in the available area of the guiding sound wave W can know the remaining time according to the frequency of the guided sound wave W.

Preferably, the blind guiding equipment (100, 100b) also includes a guiding termination sensor 5 disposed in a crosswalk ending area E, and the crosswalk ending area E is located at another end of the pedestrian crosswalk C in such a manner that the crosswalk ending area E is opposite to the crosswalk beginning area S. The crosswalk ending area E is in signal connection with the controller 4. The controller 4 is configured to terminate the guiding sound wave broadcasting operation of the directional speaker 1 when the guiding termination sensor 5 senses that the pedestrian is in the crosswalk ending area E. As shown in FIG. 1 and FIG. 3 according to the embodiments of the present invention, the blind guiding equipment (100, 100b) is provided with the guiding termination sensor 5. The guiding termination sensor 5, whose working principle is similar to that of the trigger sensor 21, can generate terminating information when triggered by a trigger operation of the portable trigger 22b. When receiving the terminating information, the controller 4 terminates the guiding sound wave broadcasting operation of the directional speaker 1, and thereby interference with another blind guiding equipment and occurrence of noise can be reduced. Furthermore, the sound alert or the vibration alert 222 of the portable trigger (22a, 22b) can be configured to produce the notification sound or the notification vibration when the guiding termination sensor 5 is triggered by the portable trigger (22a, 22b).

The above description is only an explanation of the preferred embodiments of the present invention. One having ordinary skill in the art can make various modifications according to the above description and the claims defined below. However, those modifications shall still fall within the scope of the present invention.

What is claimed is:

1. A blind guiding equipment in a pedestrian crosswalk, comprising:
   a directional speaker disposed facing the pedestrian crosswalk, the directional speaker being configured to, when activated, emit a guiding sound wave which propagates along a predetermined directional propagating path, the predetermined directional propagating path being extended along the pedestrian crosswalk;

a calling transmitter disposed in a crosswalk beginning area located at one end of the pedestrian crosswalk, the calling transmitter being configured to generate calling data when the calling transmitter is triggered by a trigger operation;

an access status sensor configured to sense a current status of a traffic signal which belongs to the pedestrian crosswalk to obtain access status data, the access status data being related to whether a pedestrian is allowed to cross the pedestrian crosswalk or the pedestrian is not allowed to cross the pedestrian crosswalk; and a controller which is in signal connection with the calling transmitter, the traffic signal state sensor and the directional speaker, the controller being configured to activate the directional speaker, when the calling data has been received and the access status data has indicated that the pedestrian is allowed to cross the pedestrian crosswalk, to guide a visually impaired person to follow the directional guiding sound wave to cross along the pedestrian crosswalk, wherein the directional speaker is a 40 KHz ultrasonic directional speaker array, and the directional speaker produces the guiding sound wave by combining a non-directional modulating wave with a directional carrier wave such that the guiding sound wave becomes a narrow and focused sound beam which propagates along the predetermined directional propagating path instead of spreading over a wide area.

2. The blind guiding equipment as claimed in claim 1, further comprising a portable trigger, the portable trigger being carried by the pedestrian, the calling transmitter being provided with a trigger sensor, the trigger sensor being operated within a sensing coverage area which correspondingly covers the crosswalk beginning area, wherein the calling transmitter is triggered by the trigger operation from the portable trigger to transmit the calling data when the trigger sensor has sensed the trigger operation which is from the portable trigger is sensed within the sensing coverage area.

3. The blind guiding equipment as claimed in claim 1, further comprising a guiding lane provided in the pedestrian crosswalk, the guiding lane being extended along the directional propagating path.

4. The blind guiding equipment as claimed in claim 2, further comprising a guiding lane provided in the pedestrian crosswalk, the guiding lane being extended along the directional propagating path.

5. The blind guiding equipment as claimed in claim 1, further comprising a guiding termination sensor disposed in a crosswalk ending area, the crosswalk ending area located at another end of the pedestrian crosswalk in such a manner that the crosswalk ending area is opposite to the crosswalk beginning area, the crosswalk ending area being in signal connection with the controller, wherein the controller is configured to terminate the guiding sound wave broadcasting operation of the directional speaker when the guiding termination sensor senses that the pedestrian is in the crosswalk ending area.

6. The blind guiding equipment as claimed in claim 2, further comprising a guiding termination sensor disposed in a crosswalk ending area, the crosswalk ending area located at another end of the pedestrian crosswalk in such a manner that the crosswalk ending area is opposite to the crosswalk beginning area, the crosswalk ending area being in signal connection with the controller, wherein the controller is configured to terminate the guiding sound wave broadcasting operation of the directional speaker when the guiding termination sensor senses that the pedestrian is in the crosswalk ending area.

7. The blind guiding equipment as claimed in claim 2, wherein the portable trigger is provided with an electrical conductor, the triggering sensor is a touch sensing circuit laid in the crosswalk beginning area such that the portable trigger is able to be sensed by the triggering sensor when the electrical conductor is within the sensing coverage area.

8. The blind guiding equipment as claimed in claim 2, wherein the portable trigger is provided with a sound alert or a vibration alert configured to produce a notification sound or a notification vibration when the calling transmitter is triggered by the portable trigger.

9. The blind guiding equipment as claimed in claim 2, wherein the portable trigger is in the shape of a cane for the visually impaired person.

10. The blind guiding equipment as claimed in claim 2, wherein the portable trigger is in the shape of a shoe attachment which is attached in a shoe.

11. The blind guiding equipment as claimed in claim 1, wherein the controller is configured to change sound properties of the guiding sound wave broadcasting from the directional speaker according to the remaining time that the pedestrian is allowed to cross the pedestrian crosswalk.

* * * * *